(12) United States Patent
Cociglio

(10) Patent No.: US 12,739,185 B2
(45) Date of Patent: Sep. 15, 2026

(54) ROUND-TRIP TIME MEASUREMENT IN A PACKET-SWITCHED COMMUNICATION NETWORK

(71) Applicant: Telecom Italia S.p.A., Milan (IT)

(72) Inventor: Mauro Cociglio, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 314 days.

(21) Appl. No.: 18/574,331

(22) PCT Filed: Jun. 29, 2022

(86) PCT No.: PCT/EP2022/067828
§ 371 (c)(1),
(2) Date: Dec. 27, 2023

(87) PCT Pub. No.: WO2023/275110
PCT Pub. Date: Jan. 5, 2023

(65) Prior Publication Data

US 2024/0291742 A1 Aug. 29, 2024

(30) Foreign Application Priority Data

Jun. 30, 2021 (IT) ........................ 102021000017129

(51) Int. Cl.
*H04L 43/0864* (2022.01)

(52) U.S. Cl.
CPC ................................ *H04L 43/0864* (2013.01)

(58) Field of Classification Search
CPC ................................................... H04L 43/0864
(Continued)

(56) References Cited

FOREIGN PATENT DOCUMENTS

| | | | | |
|---|---|---|---|---|
| CN | 110061920 A * | 7/2019 | | H04L 45/34 |
| IT | 2018 0000 4914 A1 | 10/2019 | | |
| WO | WO-2014191048 A1 * | 12/2014 | | H04L 43/0829 |

OTHER PUBLICATIONS

Bulgarella, et al.; "Performance measurements of QUIC communications", Proceedings of the Applied Networking Research Workshop, ACM, New York, NY, USA, Jul. 22, 2019, pp. 8-14, XP058459744, 2-11,13 DOI: 10.1145/3340301.3341127.

(Continued)

*Primary Examiner* — Christopher R Crompton
(74) *Attorney, Agent, or Firm* — XSENSUS LLP

(57) ABSTRACT

It is disclosed a method for transmitting a bidirectional packet flow between two nodes of a packet-switched communication network. Each node applies a respective marking value to the packets to be transmitted to the other node. Each node switches the respective marking value applicable to the packets to be transmitted to the other node upon detection that the marking value applied to the packets which are being received from the other node has been switched. Before switching its respective marking value applicable to the packets to be transmitted to the other node, one of the nodes waits a wait time $T_W$. A measurement point placed between the two nodes may provide RTT measurements based on the detection times of the switching of the applicable marking value in the transmitted packets. However, the measurement point may provide correct RTT measurements only if it knows the value of the wait time $T_W$.

14 Claims, 5 Drawing Sheets

(58) Field of Classification Search
USPC .......................................................... 370/252
See application file for complete search history.

(56) References Cited

OTHER PUBLICATIONS

Cociglio, et al.; “Client-Server Explicit Performance Measurements; draft-cfb-ippm-spinbit-measurements-01.txt”, Client-Server Explicit Performance Measurements; draft-cfb-ippm-spinbit-measurements-01.txt ; Internet-Draft: IPPM, Internet Engineering Task Force, IETF; Standardworkingdraft, Internet Society (ISOC) No. 1, Mar. 23, 2020, pp. 1-25, XP015138816, Retrieved from the Internet Mar. 23, 2020: URL:https://tools.ietf.org/html/draft-cfbippm-spinbit-measurements-01.

Trammel, et al.; Internet draft “The addition of a Spin Bit to the QUIC Transport Protocol draft-trammel-quic-spin-01”, Dec. 13, 2017.

Cociglio, et al.; Internet draft “Explicit Flow Measurements techniques draft-mdt-ippm-explicit-flow-measurements-01”, Feb. 22, 2021.

International Search Report issued Aug. 8, 2022 in corresponding International Patent Application No. PCT/EP2022/067828, 4 pages.

* cited by examiner

ROUND-TRIP TIME MEASUREMENT IN A PACKET-SWITCHED COMMUNICATION NETWORK

CROSS-REFERENCE TO RELATED APPLICATIONS

This application is a national stage application, filed under 35 U.S.C. § 371, of International Patent Application No. PCT/EP2022/067828, filed Jun. 29, 2022, which claims priority from Italian Patent Application No. 102021000017129, filed Jun. 30, 2021, the entire contents of each are incorporated herein by reference.

TECHNICAL FIELD

The present invention relates to the field of communication networks. In particular, the present invention relates to a round-trip time (RTT) measurement on a bidirectional packet flow carrying live traffic through a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Each packet is transmitted at a transmission time by the source node and is received at a reception time by the destination node. The time lapsing between transmission time and reception time is typically called "one-way delay". The one-way delay of a packet mainly depends on the number of possible intermediate nodes crossed by the packet from source to destination, the processing time of the packet by each node and the propagation time along the links.

Techniques are known which provide RTT (round-trip time) measurements, instead of one-way delay measurements. The RTT is the time lapsing between transmission time of a packet and reception time of an acknowledge packet transmitted in the opposite direction. RTT measurements are helpful especially because they do not require mutual synchronization of the local clocks at the various network nodes.

While some RTT measurement techniques (e.g. Ping) make use of artificial packets expressly generated for measurement purpose, some other RTT measurement techniques are performed on live traffic, namely on packets not generated for the purpose of performing the measurement.

As known, QUIC (Quick UDP Internet Connections) is a transport layer (layer 4) network protocol designed to support multiplexed connections between two endpoints over User Datagram Protocol (UDP).

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on two counter-propagating packet flows exchanged between two endpoints of a QUIC connection. According to the Internet draft, both the endpoints (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

M. Cociglio et al. Internet draft "Explicit Flow Measurements techniques draft-mdt-ippm-explicit-flow-measurements-01", Feb. 22, 2021 discloses the addition of a so-called "delay bit" in the QUIC header. Unlike the spin bit, which is set in every packet transmitted on the QUIC connection, the delay bit is set only once per round trip. When the delay bit is used, a single packet with the delay bit (also called "delay sample") bounces between a client and a server during a round trip. An observer placed at an intermediate point, observing a single direction of traffic, tracking the delay sample and the relative timestamp, can measure the round trip delay of the connection.

SUMMARY OF THE INVENTION

The Applicant has perceived the need to improve the known RTT measurements disclosed by the above Internet drafts.

In particular, the Applicant has noticed that the RTT measurement as obtained by the observer provides a rough indication of the distance between client and server, and hence of the physical position of the client. A non authorized party could then place an observer between a client and a server implementing the marking of the spin bit and/or delay bit in their exchanged packets, measure the RTT based on the spin bit and/or delay bit, and derive a rough indication of the physical distance between client and server therefrom. Based on such rough indication, the non authorized party could determine the client's physical position and even the client's identity, thereby violating its privacy.

In order to partially address this privacy issue, the above Internet draft of B. Trammel et al. provides that some endpoints may disable use of the spin bit in specific deployment scenarios, e.g. for servers and clients where the RTT would reveal the presence of a VPN or proxy. To avoid making these connections identifiable based on the usage of the spin bit, all endpoints randomly disable "spinning" for at least one eighth of connections.

The Applicant has however noticed that, in principle, a heuristic algorithm could be found, which is capable of identifying the connections having the "spinning" disabled. This would allow the non authorized party to ignore such connections and consider the RTT measurements on the other ones only, thereby obtaining anyway the desired information on the client's physical position and/or identity.

In view of the above, the Applicant has tackled the problem of providing a method for transmitting a bidirectional packet flow carrying live traffic exchanged between two nodes of a packet-switched communication network, which enables RTT measurements on the packet flow while preventing non authorized parties to derive from such RTT measurements privacy-sensitive information about at least one of the nodes, in particular the one acting as client.

In the following description and in the claims, the expression "enabling an RTT measurement" will designate an operation of marking and/or conditioning the packets of the bidirectional packet flow to be measured in such a way that an RTT measurement can be made by a measurement point placed on the path of the packet flow, either at an intermediate position of the path or at an endpoint of the path.

According to embodiments of the present invention, the above problem is solved by a method wherein each node applies a respective marking value (by way of non limiting example, the spin bit value or the delay bit value) to the packets to be transmitted to the other node. Each node switches its applicable marking value when it detects that the marking value applied to the packets which are being received from the other node has been switched, thereby transmitting to the other node one or more packets with the applicable marking switched. Before performing the switching (and hence starting transmission of the one or more packets with applicable marking value switched), at least one of the nodes waits a wait time $T_W$ since detection of the switching of the marking value applied to the packets which are being received from the other node.

This operation of the nodes advantageously enables RTT measurements on the packet flow, while preventing non authorized parties to derive from such RTT measurements privacy-sensitive information about the node(s) which applies the wait time $T_W$.

Assuming that, before the measurement session, both the nodes are configured with an applicable marking value (the spin bit value, by way of example) equal to e.g. 0, a first node (for example the node acting as client of a QUIC connection) starts a measurement session based on the spin bit technique by switching its applicable marking value from 0 to 1, thereby starting transmission of a block of packets with marking value equal to 1. As the second node (for example the node acting as server of the QUIC connection) detects such switching in the packets which are being received from the first node, it also switches its applicable marking value from 0 to 1, thereby starting transmission of a block of packets with marking value equal to 1. As the first node detects such switching in the packets which are being received from the second node, it waits a wait time $T_W$ and then it switches its applicable marking value back from 1 to 0, thereby starting transmission of a block of packets with marking value equal to 0. And so on.

A measurement point placed on the path of the bidirectional packet flow (namely, at an intermediate position or at any of the two nodes) may then detect, in the packets transmitted from the first node to the second node, the first switching from 0 to 1 and the second switching from 1 to 0 of the marking value applied by the first node. The RTT may then be measured as the time lapsing between the detection times of these two consecutive switching of the marking value applied by the first node, decreased by the wait time $T_W$.

Advantageously, the measurement point is then capable of providing a correct RTT measurement between the two nodes only if it knows the value of the wait time $T_W$. Hence, if a non authorized party places a measurement point on the path of the bidirectional packet flow, but the measurement point has no knowledge of the value of the wait time $T_W$ (or even of the fact that a wait time $T_W$ is applied), it may at most measure the time lapsing between two consecutive switching of the applied marking value, thereby obtaining an incorrect end-to-end RTT measurement affected by an error equal to the wait time $T_W$. Since the wait time $T_W$ is unknown, such error can not be compensated. The real reciprocal distance between the two nodes can not therefore be determined, and then any privacy-sensitive information relating to the nodes (in particular, their reciprocal distance) is advantageously protected.

According to a first aspect, the present invention provides a method for transmitting a bidirectional packet flow between two nodes of a packet-switched communication network, each one of the two nodes applying a respective marking value to packets of the bidirectional packet flow to be transmitted to the other one of the two nodes, the method comprising:

a) by each one of the two nodes, switching the respective marking value applicable to packets of the bidirectional packet flow to be transmitted to the other one of the two nodes upon detection of a switching of the marking value applied to packets of the bidirectional packet flow which are being received from the other one of the two nodes, wherein at least one of the two nodes, upon detection of the switching of the marking value applied to packets of the bidirectional packet flow which are being received from the other one of the two nodes, waits a wait time $T_W$ before switching the respective marking value applicable to packets of the bidirectional packet flow to be transmitted to the other one of the two nodes.

According to an embodiment, step a) comprises, after the switching, keeping the respective marking value applicable to packets of the bidirectional packet flow to be transmitted to the other one of the two nodes fixed, until a further switching of the marking value applied to packets of the bidirectional packet flow which are being received from the other one of the two nodes is detected.

According to another embodiment, step a) comprises, after the switching, transmitting one packet of the bidirectional packet flow to the other one of the two nodes and then switching again the respective marking value applicable to packets of the bidirectional packet flow to be transmitted to the other one of the two nodes.

Preferably, the value of the wait time $T_W$ is selected by the at least one node, the value of the wait time $T_W$ being unknown to parties non authorized by an entity managing the at least one node.

Preferably, the at least one node selects the value of the wait time $T_W$ in a random way from a predefined selection range.

According to an advantageous variant, a probability density function in the predefined selection range is non uniform, the probability of lower values of the predefined selection range being higher than the probability of higher values of the predefined selection range.

Preferably, the at least one node periodically changes the value of the wait time $T_W$.

According to an advantageous variant, the at least one node changes the value of the wait time $T_W$ when it is assigned a new IP address.

Preferably, if the at least one node runs more than one application generating packets of the bidirectional packet flow, the more than one application apply a same value of the wait time $T_W$.

According to an embodiment, at least one of the two nodes performs the switching of the respective marking value applicable to the packets of the bidirectional packet flow to be transmitted to the other one of the two nodes only if a time lapsing between the detection and a subsequent transmission of a packet to the other one of the two nodes does not exceed a respective predefined threshold.

Preferably, the at least one of the two nodes forces the switching of the respective marking value applicable to packets of the bidirectional packet flow to be transmitted to the other one of the two nodes when a maximum time Tmax has lapsed since last switching of the respective marking value applicable to packets of the bidirectional packet flow to be transmitted to the other one of the two nodes.

According to a second aspect, the present invention provides a method for performing a round-trip time measurement on a bidirectional packet flow transmitted between two nodes of a packet-switched communication network, each one of the two nodes applying a respective marking value to packets of the bidirectional packet flow to be transmitted to the other one of the two nodes, the method comprising the steps of the method as set forth above and:

b) by a measurement point placed on a path of the bidirectional packet flow, detecting a first switching and a second switching of the marking value applied to packets of the bidirectional packet flow transmitted from one of the two nodes and to the other one of the two nodes and providing a round-trip time measurement between the two nodes as a time lapsing between the first switching and the second switching, decreased by the wait time $T_W$.

Optionally, the method may also comprise:

c) by the measurement point, detecting also an intervening switching of the marking value applied to packets of the bidirectional packet flow transmitted from the other one of the two nodes and to the one of the two nodes, the intervening switching occurring between the first switching and the second switching, and providing at least one of:
   - a further round-trip time measurement between the measurement point and the other one of the two nodes as a time lapsing between the first switching and the intervening switching; and
   - a still further round-trip time measurement between the one of the two nodes and the measurement point as a time lapsing between the intervening switching and the second switching, decreased by the wait time $T_W$.

According to another aspect, the present invention provides a node for a packet-switched communication network, the node being configured to exchange a bidirectional packet flow with another node of the packet-switched communication network, the node being configured to apply a respective marking value to packets of the bidirectional packet flow to be transmitted to the other node, the node being configured to:

a) switch the respective marking value applicable to packets of the bidirectional packet flow to be transmitted to the other node upon detection of a switching of the marking value applied to packets of the bidirectional packet flow which are being received from the other node, wherein the node is further configured to, upon detection of the switching of the marking value applied to packets of the bidirectional packet flow which are being received from the other node, wait a wait time $T_W$ before switching the respective marking value applicable to packets of the bidirectional packet flow to be transmitted to the other node.

According to another aspect, the present invention provides a packet-switched communication network comprising two nodes exchanging a bidirectional packet flow, each one of the two nodes applying a respective marking value to packets of the bidirectional packet flow to be transmitted to the other one of the two nodes, wherein:

a) each one of the two nodes is configured to switch the respective marking value applicable to packets of the bidirectional packet flow to be transmitted to the other one of the two nodes upon detection of a switching of the marking value applied to packets of the bidirectional packet flow which are being received from the other one of the two nodes, wherein at least one of the two nodes is further configured to, upon detection of the switching of the marking value applied to packets of the bidirectional packet flow which are being received from the other one of the two nodes, wait a wait time $T_W$ before switching the respective marking value applicable to packets of the bidirectional packet flow to be transmitted to the other one of the two nodes.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
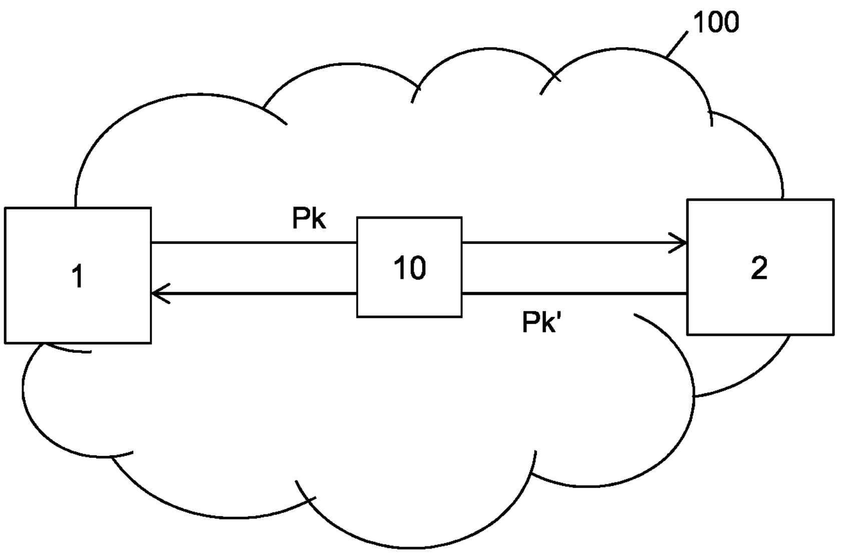
FIG. 1 schematically shows a packet-switched communication network in which the method for performing performance measurements according to embodiments of the present invention is implemented.

FIG. 1 schematically shows a packet-switched communication network 100 configured to perform an RTT measurement according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The nodes 1, 2 exchange a bidirectional packet flow including packets Pk transmitted from the node 1 to the node 2 and packets Pk' transmitted from the node 2 to the node 1, as schematically depicted in FIG. 1. The packets Pk, Pk' carry live traffic, namely they are not generated for the purpose of the one-way delay measurement. The packets Pk may belong to a same packet flow (namely, they may all have a same source address and a same destination address, e.g. a same IP source address and a same IP destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
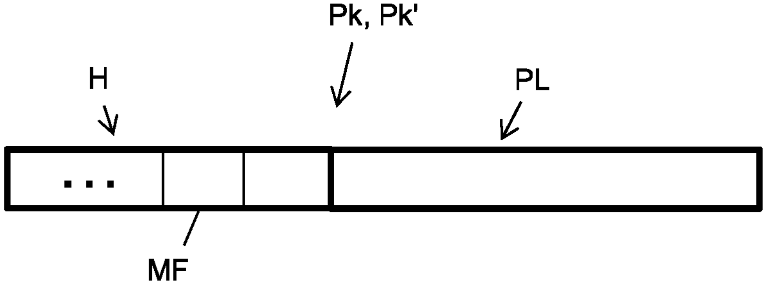
FIG. 2 schematically shows the structure of a packet exchanged in the communication network of FIG. 1, according to embodiments of the present invention.

In particular, as schematically depicted in FIG. 2, each packet Pk, Pk' comprises a payload PL comprising user data and at least one header H. In case of multiple headers, each header pertains to a different network layer. For example, each packet Pk, Pk' may comprise a network layer header (such as an IP header) and transport layer header (such as a QUIC+UDP header or a TCP header). One of the headers H (typically, the network layer header) comprises packet forwarding information, namely information allowing the packets Pk to reach the network node 2 and the packets Pk' to reach the node 1.

Each packet Pk, Pk' also preferably comprises at least one measurement dedicated field MF (also termed herein after "marking field") supporting a RTT measurement on the bidirectional packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header. The marking field MF comprises one or more bits, preferably a single bit. The marking field MF may be set to anyone of two alternative marking values (e.g. 0 and 1). By way of non-limiting example, if the packets Pk, Pk' are formatted according to the QUIC protocol, the marking field MF may be the spin bit comprised in the QUIC header as disclosed in the above Internet draft of B. Trammel et al., or the delay bit comprised in the QUIC header as disclosed in the above Internet draft of M. Cociglio et al.

Each node 1, 2 sets the value of the marking field MF in its respective outgoing packets Pk, Pk', before transmitting them to the other node 2, 1, so as to enable an RTT measurement between the nodes 1, 2. The marking value which each node 1, 2 applies to the packets Pk, Pk' to be transmitted to the other node 2, 1 will be termed herein after "applicable marking value" and will be designated as M1 and M2, respectively. When no RTT measurements shall be enabled, the applicable marking values M1, M2 are both set to a same value by the nodes 1, 2, e.g. 0.

Figure 3:
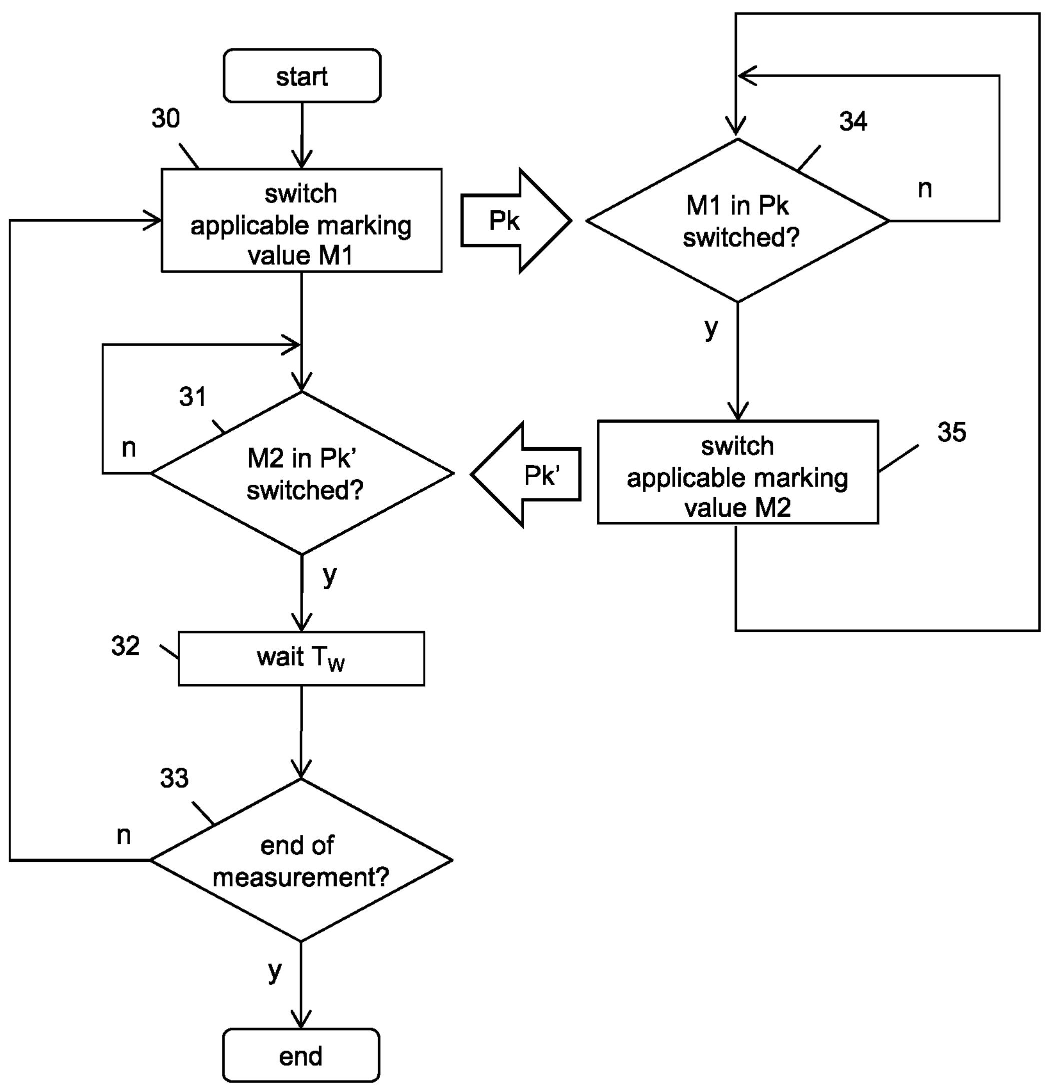
FIG. 3 is a flow chart of the operation of two nodes of the communication network of FIG. 1, according to an embodiment of the present invention.

With reference now to the flow chart of FIG. 3, the operation of the nodes 1, 2 will be described in further detail. If the nodes 1, 2 are the endpoints of a QUIC connection, the node 1 may be, for example, the one acting as client of the QUIC connection, while the node 2 may be, for example, the one acting as server of the QUIC connection.

The node 1 preferably starts a measurement session by performing a first switching of its applicable marking value M1 (step 30). For example, if M1=0 before the measurement session is started, following to step 30 the applicable marking value M1 of the node 1 becomes M1=1.

Hence, the node 1 starts transmitting to the node 2 one or more packets Pk with their marking field MF set to M1=1. If for example the marking field MF is the spin bit in the QUIC header of the packets Pk as disclosed in the above Internet draft of B. Trammel et al., all the packets Pk transmitted following to the switching step 30 have their marking field MF set to M1=1, until the next iteration of step 30. If, instead, the marking field MF is the delay bit in the QUIC header of the packets Pk as disclosed in the above Internet draft of M. Cociglio et al., only the first packet Pk transmitted following to the switching has its marking field MF set to M1=1. In that case, indeed, step 30 also comprises switching back the applicable marking value M1 to its previous value (namely, M1=0), after a single packet Pk with its marking field MF set to M1=1 has been transmitted.

While the node 1 transmits packets Pk to the node 2, it also receives from the node 2 packets Pk' with the marking value M2 applied by the second node 2 (the rules whereby the node 2 sets its applicable marking value M2 will be described herein below with reference to the flow chart in the right portion of FIG. 3).

As long as the node 1 does not detect any switching of the marking value M2 comprised in the packets Pk' (e.g., as long as it receives packets Pk' with M2=0), it does not perform any further switching of its applicable marking value M1.

When instead the node 1 detects that the marking value M2 applied to the packets Pk' has been switched (step 31), it preferably enters a waiting status whose duration is equal to a wait time $T_W$ (step 32).

It may be appreciated that the switching of the marking value M2 in the packets Pk' may be detected in different ways.

If for example the marking field MF is the spin bit in the QUIC header of the packets Pk' as disclosed in the above Internet draft of B. Trammel et al., then the switching of the marking value M2 is detected when one or more packets Pk' start being received, whose marking value M2 is different from the marking value M2 in the preceding packets Pk'. In this case, in order to properly detect the switching of the applicable marking value M2 in the packets Pk' and avoid inaccuracies due to possible reception sequence errors, each packet Pk' preferably comprises a sequence number: as a packet Pk' is received by the node 1, the node 1 reads its sequence number. The node 1 determines that the switching of the applicable marking value M2 in the packets Pk' has occurred only if the sequence number of the first packet Pk' with the new applicable marking value M2 is higher than the sequence number of the previously received packet Pk'.

If instead the marking field MF is the delay bit in the QUIC header of the packets Pk' as disclosed in the above Internet draft of M. Cociglio et al., then the switching of the marking value M2 is detected when a single packet Pk' is received, having its marking value M2 different from the marking value M2 in the preceding and subsequent packets Pk'. In this case, the detection is inherently immune from reception sequence errors and no sequence number mechanisms are needed.

As mentioned above, upon detection of a switching of the marking value M2, the node 1 preferably enters a waiting status whose duration is equal to a wait time $T_W$ (step 32).

In particular, at step 32 the node 1 starts a local timer counting the wait time $T_W$. The wait time $T_W$ is preferably selected by the node 1 and is known only by the node 1. Preferably, the node 1 selects the value of the wait time $T_W$ in a random way. According to a particularly preferred embodiment, the value of the wait time $T_W$ is randomly selected by the node 1 in a predefined selection range, for example 0 ms to 20 ms. More preferably, the node 1 periodically changes the value of the wait time $T_W$. For example, the node 1 may select a new random value of the wait time $T_W$ each time the node 1 is assigned a new IP address. According to a variant, the probability density function in the predefined selection range of $T_W$ is non uniform, in particular the probability of the range lower values is higher than the probability of the range higher values. This further increases the security of the mechanism, as it will be explained in further detail herein below.

Preferably, in case the node 1 runs more than one application exchanging packets Pk, Pk' with the node 2, all these applications preferably apply a same value of the wait time $T_W$.

As long as the timer is running at step 32, the node 1 does not perform any further switching of its applicable marking value M1.

When the wait time $T_W$ lapses, the node 1 preferably reverts to step 30, thereby performing another switching of the applicable marking value M1.

If for example the marking field MF is the spin bit in the QUIC header of the packets Pk' as disclosed in the above Internet draft of B. Trammel et al., at such further iteration of step 30 the node 1 switches the applicable marking value M1 back to M1=0, so that all the packets Pk transmitted following to this iteration of the switching step 30 have their marking field MF set to M1=0, until the next iteration of step 30. If, instead, the marking field MF is the delay bit in the QUIC header of the packets Pk as disclosed in the above Internet draft of M. Cociglio et al., at such further iteration of step 30 the node 1 switches the applicable marking value M1 back to M1=1, transmits a single packet Pk with its marking field MF set to M1=1, and then switches back the applicable marking value M1 to M1=0.

The above steps are iterated by the node 1, until the end of the measurement session (step 33).

In the meanwhile, the node 2 receives from the node 1 packets Pk with the marking value M1 applied by the first node 1 as described above.

As long as the node 2 does not detect any switching of the marking value M1 applied to the packets Pk (e.g. it receives packets Pk with marking value M1=0) (step 34), it preferably does not perform any switching of the its applicable marking value M2.

When instead the node 2 detects that the marking value M1 applied to the packets Pk has been switched, it preferably also switches its applicable marking value M2 (step 35).

Similarly to what discussed above in connection with step 31, also the switching of the marking value M1 applied to the packets Pk may be detected in different ways.

If for example the marking field MF is the spin bit in the QUIC header of the packets Pk as disclosed in the above Internet draft of B. Trammel et al., then the switching of the marking value M1 is detected when one or more packets Pk start being received, whose marking value M1 is different from the marking value M1 in the preceding packets Pk. In this case, in order to properly detect the switching of the applicable marking value M1 in the packets Pk and avoid inaccuracies due to possible reception sequence errors, each packet Pk preferably comprises a sequence number: as a packet Pk is received by the node 2, the node 2 reads its sequence number. The node 2 determines that the switching of the applicable marking value M1 in the packets Pk has occurred only if the sequence number of the first packet Pk with the new applicable marking value M1 is higher than the sequence number of the previously received packet Pk.

If instead the marking field MF is the delay bit in the QUIC header of the packets Pk as disclosed in the above Internet draft of M. Cociglio et al., then the switching of the marking value M1 is detected when a single packet Pk is received, having its marking value M1 different from the marking value M1 in the preceding and subsequent packets Pk. In this case, the detection is inherently immune from reception sequence errors and no sequence number mechanisms are needed.

Also the switching step 35 may be performed in different ways. If for example the marking field MF is the spin bit in the QUIC header of the packets Pk' as disclosed in the above Internet draft of B. Trammel et al., all the packets Pk' transmitted following to the switching step 35 have their marking field MF set to M2=1, until the next iteration of step 35. If, instead, the marking field MF is the delay bit in the QUIC header of the packets Pk' as disclosed in the above Internet draft of M. Cociglio et al., only the first packet Pk' transmitted following to the switching has its marking field MF set to M2=1. In that case, indeed, step 35 also comprises switching back the applicable marking value M2 to its previous value (namely, M2=0), after a single packet Pk' with its marking field MF set to M2=1 has been transmitted.

This operation of the nodes 1, 2 advantageously enables RTT measurements on the packet flow Pk, PK', while preventing non authorized parties from deriving from such RTT measurements privacy-sensitive information about the node 1 which applies the wait time $T_W$, as it will be discussed in detail with reference to FIGS. 4*a*-4*c*.

Figure 4A:
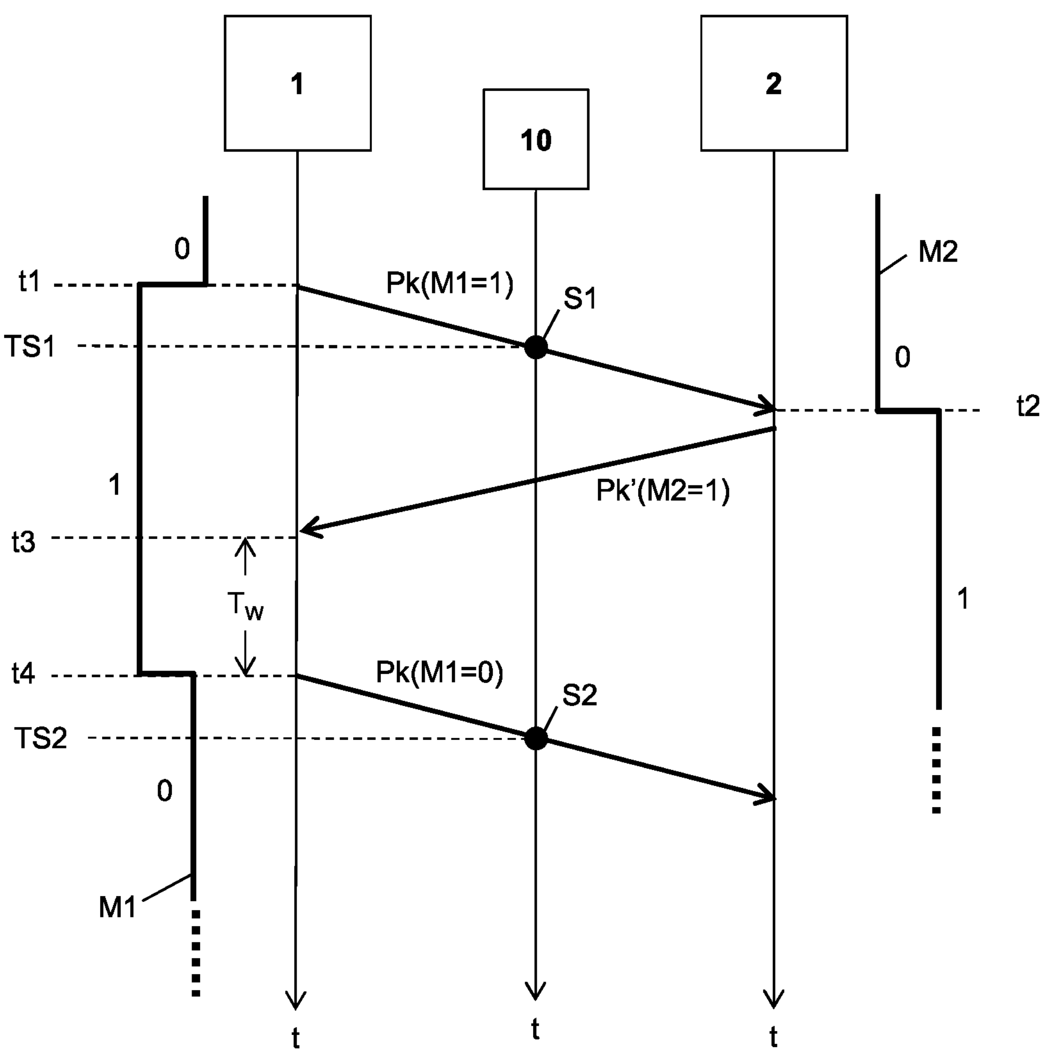
FIGS. 4*a*-4*c* show three exemplary measurements which may be performed at the first and second nodes of the communication network of FIG. 1.

With reference first to FIG. 4*a*, it is assumed that the marking field MF is the spin bit as disclosed in the above Internet draft of B. Trammel et al. and that, before the measurement session, both the nodes 1, 2 are configured with an applicable marking value M1, M2 equal to 0.

At time t1 the node 1 starts a measurement session by switching its applicable marking value M1 from 0 to 1 (step 30).

As long as the node 2 receives packets Pk with marking value M1 equal to 0, it keeps its own applicable marking value M2 fixed (step 34). Then, at time t2, the node 2 detects that the marking value M1 of the packets Pk has been switched from 0 to 1. The node 2 then switches its applicable marking value M2 from 0 to 1 (step 35).

As long as the node 1 receives packets Pk' with marking value M2 equal to 0, it keeps its own applicable marking value M1 fixed (step 31). Then, at time t3, the node 1 detects that the marking value M2 of the packets Pk' has been switched from 0 to 1. The node 1 then enters a waiting status whose duration is equal to a wait time $T_W$ (step 32), during which it does not perform any switching of its applicable marking value M1.

Then, at time t4, the wait time $T_W$ lapses, and hence the node 1 reverts to step 30, thereby switching its applicable marking value M1 from 1 back to 0 (step 30).

In the scenario of FIG. 4*a*, it is assumed that a single measurement point 10 is placed on the path of the bidirectional packet flow (namely, at an intermediate position or at any of the two nodes 1, 2). Assuming that the measurement point 10 is capable of detecting the packets Pk transmitted from the node 1 to the node 2 and to read their marking value M1 as applied by the node 1, at time TS1 the measurement point 10 detects the first switching S1 from 0 to 1 of the applicable marking value M1 and at time TS2 it detects the second switching S2 from 1 to 0 of the applicable marking value M1. As apparent from FIG. 4*a*, the end-to-end RTT (namely, the RTT between the nodes 1 and 2) between the nodes 1 and 2 is the time TS2-TS1 lapsing between the detection of the two consecutive switching S1 and S2 of the marking value M1 in the packets Pk, decreased by the wait time $T_W$.

The measurement point 10 is then capable of providing a correct end-to-end RTT measurement between the two nodes 1 and 2 only if it knows the value of the wait time $T_W$. In that case, the measurement point 10 may calculate the correct value of the end-to-end RTT as:

$$RTT_{E2E} = (TS2 - TS1) - T_W \quad [1]$$

Otherwise, if the measurement point 10 is placed on the path of the bidirectional packet flow Pk, Pk' by a non authorized party who has no knowledge of the wait time $T_W$ (or even of the fact that a wait time $T_W$ is applied by the node 1), it may at most calculate the difference TS2-TS1, thereby obtaining an incorrect end-to-end RTT measurement affected by an error equal to the wait time $T_W$. Since the wait time $T_W$ is unknown, such error can not be compensated. The real reciprocal distance between the nodes 1, 2 can not therefore be determined, and then any privacy-sensitive information relating to the nodes 1, 2 (in particular, their reciprocal distance) is advantageously protected.

It may be appreciated that the same considerations apply also if the measurement point 10 were configured to detect the packets Pk' transmitted from the node 2 to the node 1 and the end-to-end RTT measurement were based on the detection times of two consecutive switching of the marking value M2 as applied by the node 2.

Figure 4B:
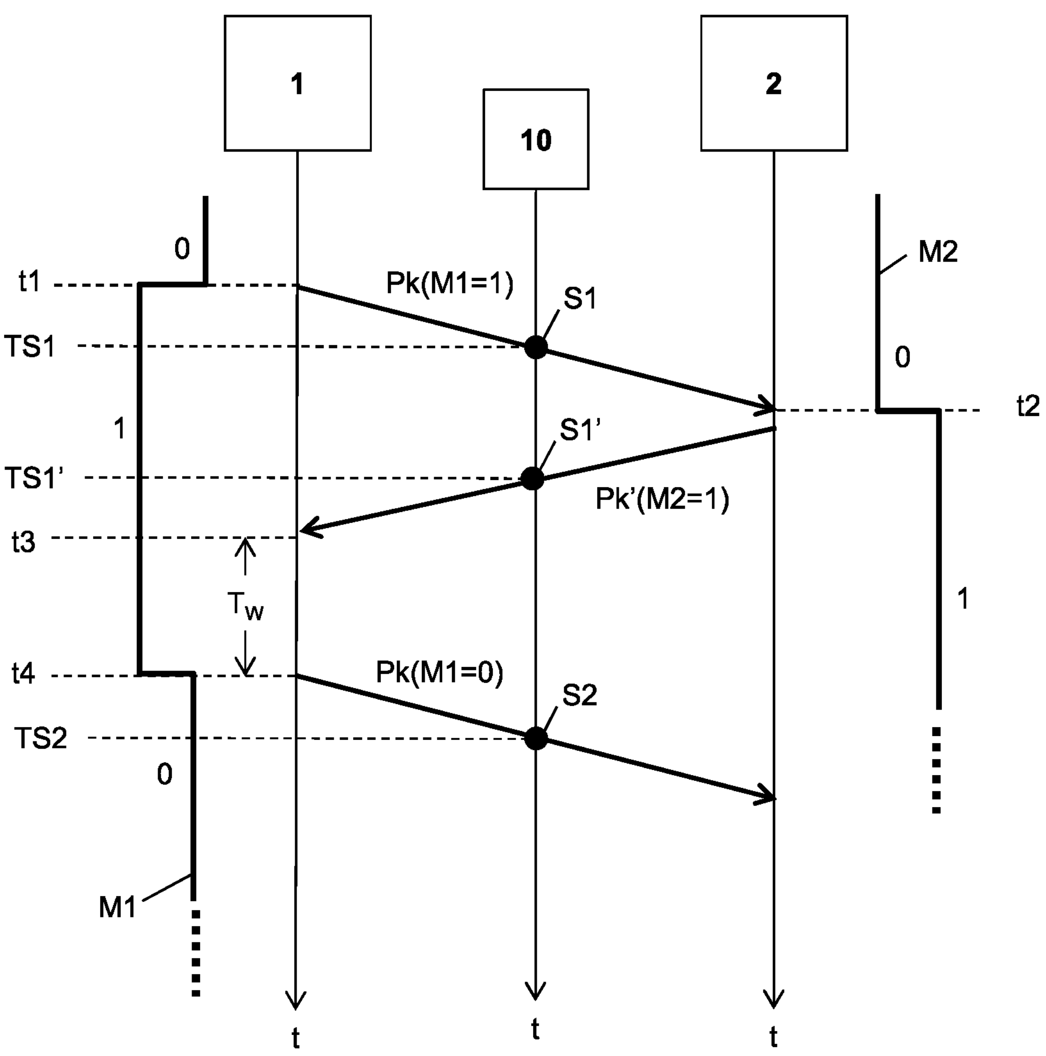

With reference to FIG. 4*b*, it is now assumed that the measurement point 10 is capable of detecting both the packets Pk and the packets Pk', and to read their marking values M1 and M2. In this case, as described above the measurement point MP1 detects the switching S1 and S2 of the applicable marking value M1 in the packets Pk at times TS1 and TS2, respectively. In addition, at time TS1', the measurement point 10 also detects the switching S1' of the applicable marking value M2 in the packets Pk' transmitted from the node 2 to the node 1. As apparent from FIG. 4*b*, the time TS1'-TS1 lapsing between the detection of the switching S1 of the marking value M1 in the packets Pk and the detection of the switching S1' of the applicable marking value M2 in the packets PK' is the right-hand RTT (namely, the RTT between measurement point 10 and node 2, also termed "upstream RTT", if the node 2 acts as the server of the end-to-end connection between node 1 and node 2).

The measurement point 10 may then calculate the value of the right-hand RTT as:

$$RTT_R = (TS1' - TS1) \quad [2]$$

It is to be noted that the measurement point 10 is capable of providing a correct right-hand RTT measurement even if it doesn't know the value of the wait time $T_W$. From such measurement, the measurement point 10 may then derive a rough indication of the relative distance between itself and the node 2, which enables it to obtain a rough indication of the position of the node 2.

Advantageously, the privacy of the node 1 however still continues being protected also in this case.

As apparent from FIG. 4*b*, indeed, the left-hand RTT (namely, the RTT between the node 1 and the measurement point 10, also termed "downstream RTT", if the node 1 acts as the client of the end-to-end connection between node 1 and node 2) is the time TS2-TS1' lapsing between the detection of the switching S1' of the marking value M2 in the packets PK' and the detection of the switching S2 of the applicable marking value M1 in the packets Pk, decreased by the wait time $T_W$.

The measurement point 10 is then capable of providing a correct left-hand RTT measurement only if it knows the value of the wait time $T_W$. In that case, the measurement point 10 may calculate the value of the left-hand RTT as:

$$RTT_L = (TS2 - TS1') - T_W \quad [3]$$

Otherwise, if the measurement point 10 is placed on the path of the bidirectional packet flow Pk, PK' by a non authorized party who has no knowledge of the wait time $T_W$ (or even of the fact that a wait time $T_W$ is applied by the node 1), it may at most calculate the difference TS2-TS1', thereby obtaining an incorrect left-hand RTT measurement affected by an error equal to the wait time $T_W$. Since the wait time $T_W$ is unknown, such error can not be compensated. The real reciprocal distance between the node 1 and the measurement point 10 can not therefore be determined, and then any privacy-sensitive information relating to the node 1 (in particular, its distance from the measurement point 10) is still advantageously protected.

The privacy of the node 1 continues being protected also in case more than one measurement point is placed on the path of the bidirectional packet flow Pk, Pk'.

Figure 4C:
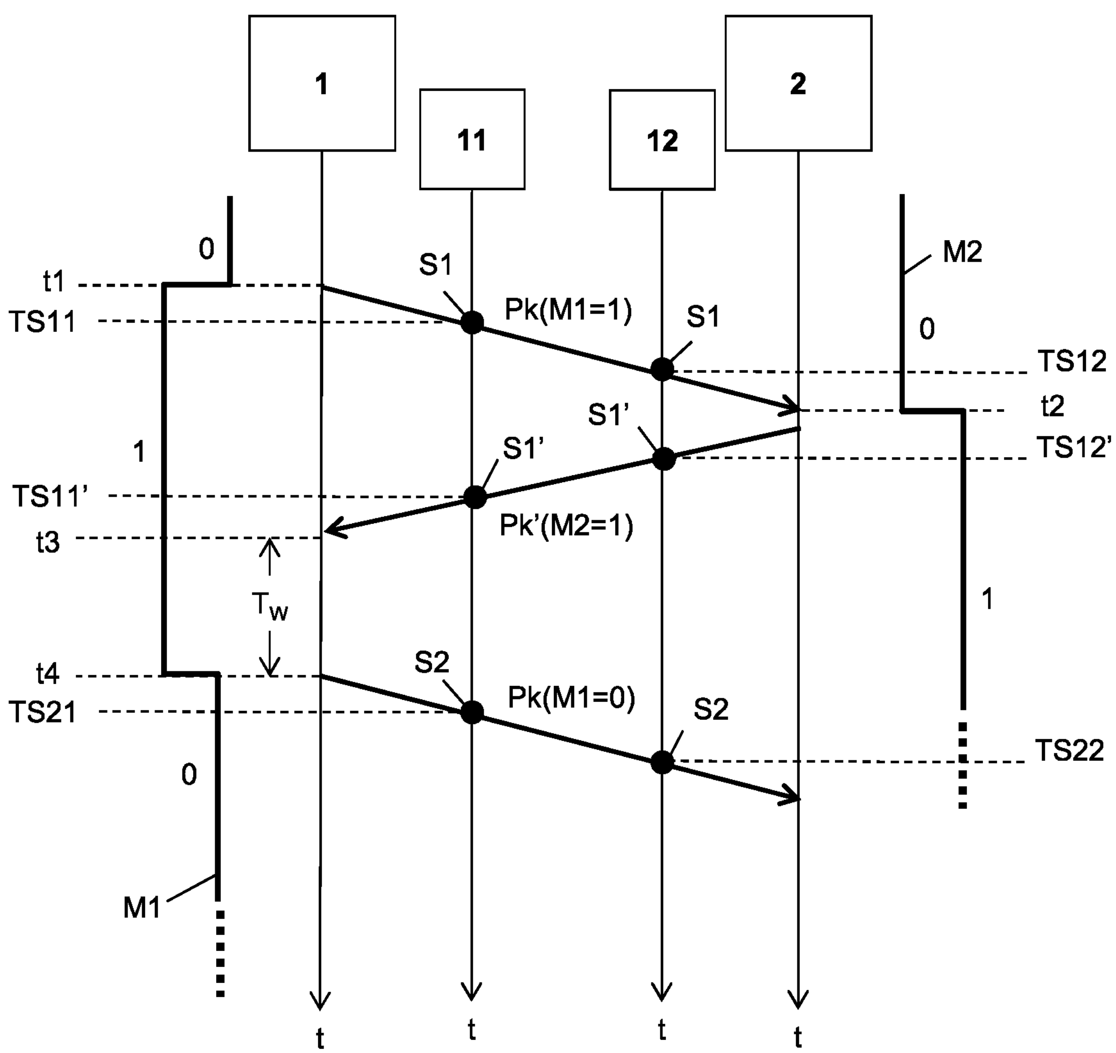

In the scenario of FIG. 4*c*, it is assumed that two measurement points 11, 12 are placed on the path of the bidirectional packet flow (namely, at an intermediate position or at any of the two nodes 1, 2).

Assuming that the measurement points 11, 12 are capable of detecting the packets Pk transmitted from the node 1 to the node 2 and to read their marking value M1 as applied by the node 1, at time TS11 the measurement point 11 detects the first switching S1 from 0 to 1 of the applicable marking value M1 and at time TS21 it detects the second switching S2 from 1 to 0 of the applicable marking value M1. Similarly, at time TS12 the measurement point 12 detects the first switching S1 from 0 to 1 of the applicable marking value M1 and at time TS22 it detects the second switching S2 from 1 to 0 of the applicable marking value M1.

It is assumed that the measurement points 11, 12 are also capable of detecting the packets Pk' transmitted from the node 2 to the node 1 and to read their marking value M2 as applied by the node 2. Hence, at time TS11' the measurement point 11 detects the switching S1' from 0 to 1 of the applicable marking value M2, while at time TS12' the measurement point 12 detects the same switching S1' from 0 to 1 of the applicable marking value M2.

From the above detection times, the following RTT measurements may be provided:

- end-to-end RTT ($RTT_{E2E}$), calculated as either the time TS21-TS11 lapsing between the detection of the two consecutive switching S1 and S2 by the measurement point 11, decreased by the wait time $T_W$; or calculated as the time TS22-TS12 lapsing between the detection of the two consecutive switching S1 and S2 by the measurement point 12, decreased by the wait time $T_W$;
- right-hand RTT between measurement point 11 and node 2 ($RTT_{R1}$), calculated as the time TS11'-TS11 lapsing between detection of the switching S1 and detection of the switching S1' by the measurement point 11;
- right-hand RTT between measurement point 12 and node 2 ($RTT_{R2}$), calculated as the time TS12'-TS12 lapsing between detection of the switching S1 and detection of the switching S1' by the measurement point 12;
- left-hand RTT between node 1 and measurement point 11 ($RTT_{L1}$), calculated as the time TS21-TS11' lapsing between detection of the switching S1' and detection of the switching S2 by the measurement point 11, decreased by the wait time $T_W$; and left-hand RTT between node 1 and measurement point 12 ($RTT_{L2}$), calculated as the time TS22-TS12' lapsing between detection of the switching S1' and detection of the switching S2 by the measurement point 12, decreased by the wait time $T_W$.

It may be appreciated that only the right-hand measurements $RTT_{R1}$ and $RTT_{R2}$ are independent of the wait time $T_W$, while the end-to-end measurement $RTT_{E2E}$ and the left-hand measurements $RTT_{L1}$ and $RTT_{L2}$ are all dependent on the wait time $T_W$. The correct values of $RTT_{E2E}$, $RTT_{L1}$ and $RTT_{L2}$ may then be calculated only by authorized parties having a knowledge of the value of $T_W$, while non authorized parties having no knowledge of the value of $T_W$ will provide incorrect values affected by an error equal to $T_W$, which they won't be capable to compensate. Any privacy-sensitive information on the node 1 derivable from the distance of the node 1 from the node 2 and/or from the measurement point 11 and/or from the measurement point 12 then continues being protected also in this case.

It has to be noted that the left-hand measurements $RTT_{L1}$ and $RTT_{L2}$ could be indirectly calculated. For example, $RTT_{L1}$ may be calculated as a difference between $RTT_{E2E}$ and $RTT_{R1}$ and, similarly, $RTT_{L2}$ may be calculated as a difference between $RTT_{E2E}$ and $RTT_{R2}$. It may be appreciated however that also the results of such indirect calculation are dependent on $T_W$. Hence, no correct measurement of the left-hand RTT may be provided indirectly, and hence the privacy of the node 1 continues being protected.

Another indirect measurement which may be obtained is the RTT between the measurement points 11 and 12, namely $RTT_{1-2}$. This may be calculated as either $RTT_{R1}$-$RTT_{R2}$, or $RTT_{L2}$-$RTT_{L1}$. It maybe appreciated that both the results obtained for $RTT_{1-2}$ are independent of $T_W$. While indeed both $RTT_{R1}$ and $RTT_{R2}$ are independent of $T_W$ (and hence also their difference is independent of $T_W$), $RTT_{L1}$ and $RTT_{L2}$ depend on $T_W$, but such dependence is compensated when the difference between $RTT_{L2}$ and $RTT_{L1}$ is calculated. Hence, based on the left-hand and right-hand measurements provided by the measurement points 11, 12, a correct RTT measurement may be provided between the measurement points 11, 12, even without having any knowledge of the value of the wait time $T_W$, or even of the fact that a wait time $T_W$ is applied by the node 1. Hence, even if a party is not authorized to perform RTT measurements from which privacy-sensitive information on the node 1 can be obtained, such party may nonetheless perform correct RTT measurements between the measurement points 11 and 12.

Though in the above description it has been assumed that only the node 1 applies the wait time $T_W$, according to other embodiments the node 2 may apply the wait time $T_W$. In that case, all the considerations set forth above in connection to the node 1 and the protection of privacy-sensitive information relating thereto apply to the node 2. In that case, indeed, only left-hand RTT measurements are independent of $T_W$, while end-to-end RTT measurements and right-hand RTT measurements which may be obtained by either a single measurement point or more measurement points placed between the nodes 1 and 2 are dependent of $T_W$.

According to other embodiments, both the nodes 1 and 2 apply respective wait times $T_{W1}$ and $T_{W2}$. Each node 1, 2 may select its own value of the wait time $T_{W1}$ and $T_{W2}$ independently from each other. In that case, privacy-sensitive information relating to both nodes 1, 2 are advantageously protected, because all the end-to-end, right-hand and left-hand RTT measurements which might be obtained by one or more measurement points placed between the nodes 1 and 2 are dependent of $T_{W1}$ and/or $T_{W2}$. In this case, only RTT measurements between intermediate measurement points may be performed correctly by unauthorized party having no knowledge of the values of the wait times $T_{W1}$ and $T_{W2}$. Such measurements are indeed independent of the values of the wait times $T_{W1}$ and $T_{W2}$, as discussed above in connection with FIG. 4*c*.

According to a variant of the method disclosed above, at least one of the nodes 1, 2 performs the switching of its applicable marking value M1, M2 only if it determines that the time lapsing between detection of the switching of the marking value M2, M1 applied to the packets Pk', Pk which are being received from the other node 2, 1 and transmission of the next packet Pk, Pk' to the other node 2, 1 does not exceed a predefined time threshold E1, E2.

The Applicant has indeed noticed that, since all the above RTT measurements are carried out on live traffic, the packet rate in both directions typically fluctuates in an unpredictable way and may temporarily become very low or even zero. This introduces an unpredictable delay in the reflection mechanism of the marking value carried out by each one of the nodes 1, 2. As a node 1, 2 detects a switching of the marking value M2, M1 applied to the packets Pk', Pk which are being received, it may suddenly switch its applicable marking value M1, M2 (steps 30 and 35 of the flow chart of FIG. 3). However, the switching of the marking value M1, M2 actually applied to the packets Pk, Pk' transmitted to the other node 2, 1 occurs only upon transmission of the next packet Pk, Pk'. If the transmission of such next packet Pk, Pk' is delayed due to e.g. a temporarily very low packet rate in the outgoing direction, this ultimately results in an unpredictable error on the RTT measurement carried out by the measurement point 10 which, as discussed above, is based on the detection times of two consecutive switching of the applicable marking value M1, M2.

The application of the above threshold E1, E2 at the node 1, 2 advantageously allows providing RTT measurements which are more reliable, in that they are affected by a predictable maximum error which depends only on the value of E1, E2, while being independent of the unpredictable fluctuations of the packet rates in the two opposite directions. An RTT measurement is indeed provided only for couples of consecutive switching of the applicable marking value M1, M2 in the packets Pk, Pk' for which it can be guaranteed that the unpredictable fluctuations of the packet rates in the two opposite directions introduce a certain maximum error on the RTT measurement. When this can not be guaranteed, the measurement point 10 discards the RTT measurement.

Preferably, in case only one of the nodes 1, 2 applies the wait time $T_W$, the threshold E1, E2 is applied only by the other node. This allows preserving the privacy of the node applying the wait time as discussed above, while guaranteeing that all the switching of the marking value applied to its incoming packets are reflected, independently of the packet rate in its outgoing direction. For example, if the node 1 applies the wait time $T_W$, then only the node 2 applies the threshold E2. Conversely, if only the node 2 applies the wait time $T_W$, then only the node 1 applies the threshold E1. If both the nodes 1, 2 apply a respective wait time $T_{W1}$, $T_{W2}$, then preferably no one of the nodes 1, 2 applies the threshold E1, E2.

Preferably, at least one of the nodes 1, 2 forces anyway a switching of its applicable marking value M1, M2 upon expiration of a maximum time Tmax since the last switching of its applicable marking value M1, M2. This way, the switching mechanism is restarted at most every Tmax.

It may be appreciated that randomly selecting the value of the wait time $T_W$ in a range with non uniform probability density function such that the probability of the range lower values is higher than the probability of the range higher values is particularly advantageous in this case. This way, the wait time $T_W$ has a reduced impact on the reflection mechanism and the risk that the node 1, 2 fails to switch its applicable marking value M1, M2 before expiry of Tmax due to the cumulative effect of a low packet rate in the outgoing direction and the wait time $T_W$ is advantageously reduced.

The invention claimed is:

1. A method for transmitting a bidirectional packet flow between two nodes of a packet-switched communication network, each one of said two nodes applying a respective marking value to packets of said bidirectional packet flow to be transmitted to the other one of said two nodes, said method comprising:

a) by each one of said two nodes, switching said respective marking value applicable to packets of said bidirectional packet flow to be transmitted to the other one of said two nodes upon detection of a switching of the marking value applied to packets of said bidirectional packet flow which are being received from the other one of said two nodes, wherein at least one of said two nodes, upon said detection of said switching of the marking value applied to packets of said bidirectional packet flow which are being received from the other one of said two nodes, waits a wait time $T_W$ before switching said respective marking value applicable to packets of said bidirectional packet flow to be transmitted to the other one of said two nodes, and wherein the value of said wait time $T_W$ is selected by said at least one node, said value of said wait time $T_W$ being unknown to parties non authorized by an entity managing said at least one node.

2. The method according to claim 1, wherein step a) comprises, after said switching, keeping said respective marking value applicable to packets of said bidirectional packet flow to be transmitted to the other one of said two nodes fixed, until a further switching of the marking value applied to packets of said bidirectional packet flow which are being received from the other one of said two nodes is detected.

3. The method according to claim 1, wherein step a) comprises, after said switching, transmitting one packet of said bidirectional packet flow to the other one of said two nodes and then switching again said respective marking value applicable to packets of said bidirectional packet flow to be transmitted to the other one of said two nodes.

4. The method according to claim 1, wherein said at least one node selects said value of said wait time $T_W$ in a random way from a predefined selection range.

5. The method according to claim 4, wherein a probability density function in said predefined selection range is non uniform, the probability of lower values of said predefined selection range being higher than the probability of higher values of said predefined selection range.

6. The method according to claim 1, wherein said at least one node periodically changes the value of said wait time $T_W$.

7. The method according to claim 1, wherein said at least one node changes the value of said wait time $T_W$ when it is assigned a new IP address.

8. The method according to claim 1 wherein, if said at least one node runs more than one application generating packets of said bidirectional packet flow, said more than one application apply a same value of said wait time $T_W$.

9. The method according to claim 1, wherein at least one of said two nodes performs said switching of said respective marking value applicable to said packets of said bidirectional packet flow to be transmitted to the other one of said two nodes only if a time lapsing between said detection and a subsequent transmission of a packet to said other one of said two nodes does not exceed a respective predefined threshold.

10. The method according to claim 1, wherein said at least one of said two nodes forces said switching of said respective marking value applicable to packets of said bidirectional packet flow to be transmitted to the other one of said two nodes when a maximum time Tmax has lapsed since last switching of said respective marking value applicable to packets of said bidirectional packet flow to be transmitted to the other one of said two nodes.

11. A method for performing a round-trip time measurement on a bidirectional packet flow transmitted between two nodes of a packet-switched communication network, each one of said two nodes applying a respective marking value to packets of said bidirectional packet flow to be transmitted to the other one of said two nodes, said method comprising the steps of the method according to claim 1 and:

b) by a measurement point placed on a path of said bidirectional packet flow, detecting a first switching and a second switching of the marking value applied to packets of said bidirectional packet flow transmitted from one of said two nodes and to the other one of said two nodes and providing a round-trip time measurement between said two nodes as a time lapsing between said first switching and said second switching, decreased by said wait time $T_W$.

12. The method according to claim 10, further comprising:

c) by said measurement point, detecting also an intervening switching of the marking value applied to packets of said bidirectional packet flow transmitted from said other one of said two nodes and to said one of said two nodes, said intervening switching occurring between said first switching and said second switching, and providing at least one of:

a further round-trip time measurement between said measurement point and said other one of said two nodes as a time lapsing between said first switching and said intervening switching; and a still further round-trip time measurement between said one of said two nodes and said measurement point as a time lapsing between said intervening switching and said second switching, decreased by said wait time $T_W$.

13. A node for a packet-switched communication network, said node being configured to exchange a bidirectional packet flow with another node of said packet-switched communication network, said node being configured to apply a respective marking value to packets of said bidirectional packet flow to be transmitted to said other node said node being configured to:

a) switch said respective marking value applicable to packets of said bidirectional packet flow to be transmitted to said other node upon detection of a switching of the marking value applied to packets of said bidirectional packet flow which are being received from said other node, wherein said node is further configured to, upon said detection of said switching of the marking value applied to packets of said bidirectional packet flow which are being received from said other node, wait a wait time $T_W$ before switching said respective marking value applicable to packets of said bidirectional packet flow to be transmitted to said other node, wherein the value of said wait time $T_W$ is selected by said node, the value of said wait time $T_W$ being unknown to parties non authorized by an entity managing said node.

14. A packet-switched communication network comprising two nodes exchanging a bidirectional packet flow, each one of said two nodes applying a respective marking value to packets of said bidirectional packet flow to be transmitted to the other one of said two nodes, wherein:

a) each one of said two nodes is configured to switch said respective marking value applicable to packets of said bidirectional packet flow to be transmitted to the other one of said two nodes upon detection of a switching of the marking value applied to packets of said bidirectional packet flow which are being received from the other one of said two nodes, wherein at least one of said two nodes is further configured to, upon said detection of said switching of the marking value applied to packets of said bidirectional packet flow which are being received from the other one of said two nodes, wait a wait time $T_W$ before switching said respective marking value applicable to packets of said bidirectional packet flow to be transmitted to the other one of said two nodes, wherein the value of said wait time $T_W$ is selected by said at least one node, said value of said wait time $T_W$ being unknown to parties non authorized by an entity managing said at least one node.

* * * * *